United States Patent
Chen et al.

(10) Patent No.: US 11,262,879 B1
(45) Date of Patent: Mar. 1, 2022

(54) TOUCH MODULE

(71) Applicant: TPK Advanced Solutions Inc., Fujian (CN)

(72) Inventors: Huang Chen, Xiamen (CN); Wei-Sheng Chen, Zhangpu County (CN); Ching-Mao Huang, New Taipei (TW)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

(21) Appl. No.: 17/164,593

(22) Filed: Feb. 1, 2021

(51) Int. Cl.
*G06F 3/044* (2006.01)

(52) U.S. Cl.
CPC .................................. *G06F 3/0443* (2019.05)

(58) Field of Classification Search
None
See application file for complete search history.

(56) References Cited

U.S. PATENT DOCUMENTS

2014/0375910 A1* 12/2014 Tada ..................... G06F 1/1692
349/12
2015/0029412 A1* 1/2015 Kishioka ................ C09J 133/08
349/12

FOREIGN PATENT DOCUMENTS

CN 110109579 A * 8/2019 ........... G06F 3/0412

* cited by examiner

*Primary Examiner* — Duane N Taylor, Jr.
(74) *Attorney, Agent, or Firm* — Cooper Legal Group, LLC

(57) ABSTRACT

A touch module includes a substrate, a touch sensing layer, a first transparent adhesive layer, and a second transparent adhesive layer. The substrate has a visible area and a peripheral area surrounding the visible area. The touch sensing layer is disposed on the substrate and located in the visible area. The first transparent adhesive layer is disposed on the touch sensing layer, and a dielectric constant of the first transparent adhesive layer is between 1.5 and 3.0. The second transparent adhesive layer is disposed on the first transparent adhesive layer, and a dielectric constant of the second transparent adhesive layer is between 3.0 and 8.0.

10 Claims, 4 Drawing Sheets

TOUCH MODULE

BACKGROUND

Field of Disclosure

The present disclosure relates to a touch module, and particularly relates to a touch module with high water resistance and high sensitivity.

Description of Related Art

In recent years, as touch technology has developed, transparent conductors have often been applied in many display or touch-related devices since transparent conductors can allow light to pass through while providing proper conductivity. In general, the transparent conductors may be various metal oxides, such as indium tin oxide (ITO), indium zinc oxide (IZO), cadmium tin oxide (CTO), or aluminum-doped zinc oxide (AZO). However, films made of these metal oxides cannot meet the requirements for flexibility of display devices. Therefore, a variety of flexible transparent conductors, such as a transparent conductor made of a material such as a metal nanowire, have been developed nowadays.

However, there are still many problems to be solved for display or touch devices made of metal nanowires. For example, when metal nanowires are used to make a touch electrode, in order to meet high capacitance requirements of display or touch devices, materials with high dielectric constant are often used for the optical adhesive layer of the display or touch devices. Since materials with high dielectric constant generally have better water absorptivity, they often lead to moisture intrusion from the environment, causing electro-migration of metal nanowires in the display or touch devices, thereby causing insufficient reliability of the metal nanowires and leading to a short circuit or open circuit of the device.

SUMMARY

In order to overcome the problem of electro-migration of metal nanowires caused by a high moisture intrusion rate, the present disclosure provides a touch module with at least two optically transparent adhesive layers. By adjusting the respective characteristics of the two optically transparent adhesive layers (e.g., dielectric constant, thickness, etc.), the probability of moisture intrusion from the environment can be reduced, and the touch module can be provided with high capacitance. As such, electro-migration of metal nanowires can be avoided or the speed of electro-migration of metal nanowires can be slowed down, thereby meeting the specification requirements for improving product reliability testing and ensuring that the touch module has high touch sensitivity.

According to some embodiments of the present disclosure, the touch module includes a substrate, a touch sensing layer, a first transparent adhesive layer, and a second transparent adhesive layer. The substrate has a visible area and a peripheral area surrounding the visible area. The touch sensing layer is disposed on the substrate and located in the visible area. The first transparent adhesive layer is disposed on the touch sensing layer, and a dielectric constant of the first transparent adhesive layer is between 1.5 and 3.0. The second transparent adhesive layer is disposed on the first transparent adhesive layer, and a dielectric constant of the second transparent adhesive layer is between 3.0 and 8.0.

In some embodiments of the present disclosure, the touch sensing layer includes a matrix and a plurality of metal nanostructures distributed in the matrix, and the first transparent adhesive layer is in contact with the touch sensing layer.

In some embodiments of the present disclosure, a thickness of the first transparent adhesive layer is between 10 μm and 1000 μm.

In some embodiments of the present disclosure, a ratio of a thickness of the first transparent adhesive layer to a thickness of the second transparent adhesive layer is between 0.05 and 20.

In some embodiments of the present disclosure, after 504 hours of testing under HS6590 test conditions (i.e., high temperature and high humidity test conditions: temperature of 65° C., relative humidity of 90%, and a voltage of 5 volts), a haze variation of the touch module is less than or equal to 0.3%, and a light transmittance variation of the touch module is greater than or equal to −0.3%.

In some embodiments of the present disclosure, after 504 hours of testing under HS6590 test conditions, a variation in b* value of the touch module in L*a*b* color space (also referred to as CIELAB color space, where the lightness value, L*, also referred to as "Lstar," defines black at 0 and white at 100, the a* axis represents green-red opponents, with negative values toward green and positive values toward red, and the b* axis represents blue-yellow opponents, with negative numbers toward blue and positive toward yellow) is less than or equal to 0.3.

In some embodiments of the present disclosure, after 504 hours of testing under HS6590 test conditions, a resistance variation of the touch module is greater than or equal to −15% and less than or equal to 10%.

In some embodiments of the present disclosure, the touch module further includes a cover disposed on the second transparent adhesive layer, in which a material of the cover includes an alkaline glass.

In some embodiments of the present disclosure, the alkaline glass includes a sodium glass, a potassium glass, a calcium glass, or combinations thereof.

In some embodiments of the present disclosure, the touch module further includes a peripheral circuit layer disposed between the touch sensing layer and the first transparent adhesive layer and located in the peripheral area, in which the peripheral circuit layer and the touch sensing layer constitute a step area, and the first transparent adhesive layer covers the step area.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
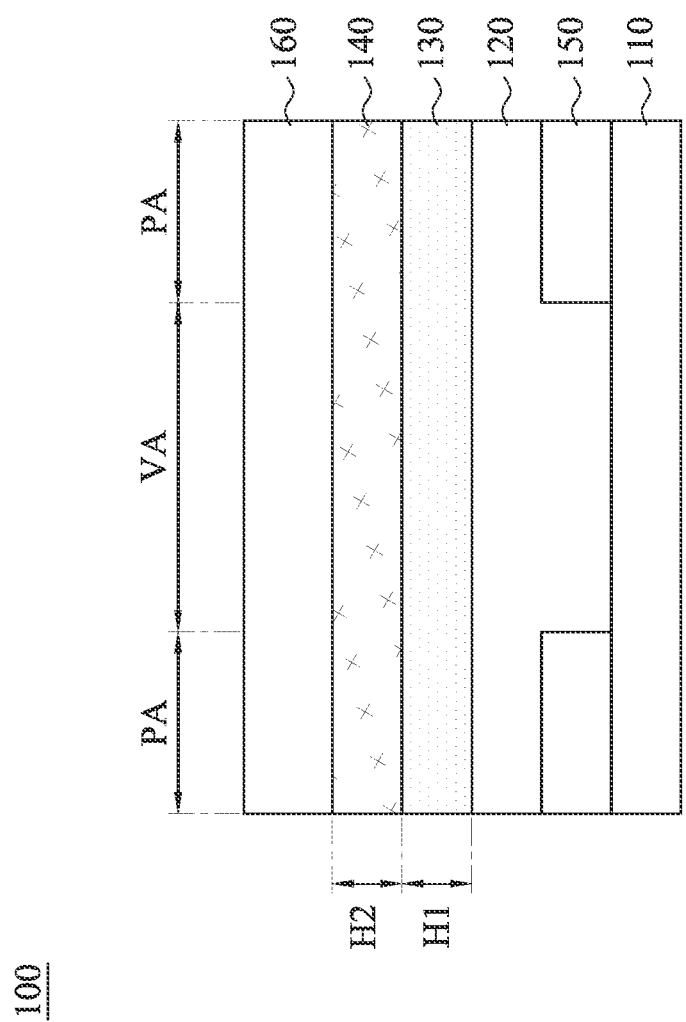
FIG. 1 is a schematic side view of a touch module according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

In addition, relative terms such as "lower" or "bottom" and "upper" or "top" can be used herein to describe the relationship between one element and another element, as shown in the figure. It should be understood that relative terms are intended to include different orientations of the device other than those shown in the figures. For example, if the device in one figure is turned over, elements described as being on the "lower" side of other elements will be oriented on the "upper" side of the other elements. Therefore, the exemplary term "lower" may include an orientation of "lower" and "upper", depending on the specific orientation of the drawing. Similarly, if the device in one figure is turned over, elements described as "below" other elements will be oriented "above" the other elements. Therefore, the exemplary term "below" can include an orientation of "above" and "below".

Reference is made to FIG. 1, which is a schematic side view of a touch module 100 according to some embodiments of the present disclosure. The touch module 100 of the present disclosure includes a substrate 110, a touch sensing layer 120, a first transparent adhesive layer 130, and a second transparent adhesive layer 140. The substrate 110 has a visible area VA and a peripheral area PA surrounding the visible area VA. In some embodiments, the touch sensing layer 120 is disposed on the substrate 110 and extends from the visible area VA to the peripheral area PA of the substrate 110. The first transparent adhesive layer 130 is disposed on the touch sensing layer 120 and extends from the visible area VA to the peripheral area PA of the substrate 110 to cover the touch sensing layer 120. The second transparent adhesive layer 140 is disposed on the touch sensing layer 120 and extends from the visible area VA to the peripheral area PA of the substrate 110 to cover the first transparent adhesive layer 130. In other words, the touch sensing layer 120, the first transparent adhesive layer 130, and the second transparent adhesive layer 140 are sequentially stacked on the substrate 110. In some embodiments, the touch module 100 may further include a peripheral circuit layer 150 disposed in the peripheral area PA of the substrate 110 and located between the substrate 110 and the touch sensing layer 120. The peripheral circuit layer 150 is connected to the touch sensing layer 120 to achieve an electrical connection between the touch sensing layer 120 and the peripheral circuit layer 150. The effect of preventing moisture intrusion is achieved in the present disclosure through the configuration of the first transparent adhesive layer 130 and the second transparent adhesive layer 140, such that the purpose of protecting electrodes (e.g., the touch sensing layer 120) in the touch module 100 is achieved, and the touch module 100 is provided with high capacitance to ensure that the touch module 100 has high touch sensitivity. A more detailed description will be given in the following description.

In some embodiments, the touch sensing layer 120 can transmit a touch sensing signal of the touch module 100 to the peripheral circuit layer 150 in the peripheral area PA for subsequent processing. In some embodiments, the touch sensing layer 120 may include a matrix and a plurality of metal nanowires (also called metal nanostructures) distributed in the matrix. The matrix may include polymers or a mixture thereof to impart specific chemical, mechanical, and optical properties to the touch sensing layer 120. For example, the matrix can provide good adhesion between the touch sensing layer 120 and other layers. As another example, the matrix can also provide good mechanical strength for the touch sensing layer 120. In some embodiments, the matrix may include a specific polymer, such that the touch sensing layer 120 has additional scratch/wear-resistant surface protection, thereby improving the surface strength of the touch sensing layer 120. The foregoing specific polymer may be, for example, polyacrylate, epoxy resin, polyurethane, polysiloxane, polysilane, poly (silicon-acrylic acid), or combinations thereof. In some embodiments, the matrix may further include a surfactant, a cross-linking agent, a stabilizer (including but not limited to, e.g., an antioxidant or an ultraviolet stabilizer), a polymerization inhibitor, or combinations of any of the foregoing ingredients, in order to improve the ultraviolet resistance of the touch sensing layer 120 and prolong a service life of the touch sensing layer 120.

In some embodiments, the metal nanowires may include, but are not limited to, silver nanowires, gold nanowire, copper nanowires, nickel nanowires, or a combination thereof. More specifically, the "metal nanowire" herein is a collective noun, which refers to a collection of metal wires of a plurality of metal elements, metal alloys, or metal compounds (including metal oxides). In addition, the number of metal nanowires included in the touch sensing layer 120 is not intended to limit the present disclosure. Since the metal nanowires of the present disclosure have excellent light transmittance, when the touch module 100 is configured to serve as a touch display module, the metal nanowires can provide good conductivity for the touch sensing layer 120 without affecting the optical properties of the touch display module 100.

In some embodiments, a cross-sectional size (e.g., a diameter of the cross section) of a single metal nanowire can be less than 500 nm, preferably less than 100 nm, and more preferably less than 50 nm, such that the touch sensing layer 120 has a lower haze. In detail, when the cross-sectional size of the single metal nanowire is greater than 500 nm, the single metal nanowire is excessively thick, resulting in an excessively high haze of the touch sensing layer 120, thus affecting the visual clarity of the visible area VA of the touch module 100. In some embodiments, an aspect ratio (length to diameter) of the metal nanowire may be between 10 and 100,000, such that the touch sensing layer 120 can have a lower electrical resistivity, a higher light transmittance, and a lower haze. In detail, when the aspect ratio of a single metal nanowire is less than 10, a conductive network may not be well formed, resulting in an excessively high resistivity of the touch sensing layer 120. Therefore, the metal nanowires must be distributed in the matrix with a greater arrangement density (i.e., the number of metal nanowires included in the touch sensing layer 120 per unit volume) in order to improve the conductivity of the touch sensing layer 120, which causes the touch sensing layer 120 to have excessively low light transmittance and excessively high haze. It is noted that other terms such as silk, fiber, or tube also have the aforementioned cross-sectional dimensions and aspect ratios and also fall within the scope of the present disclosure.

In some embodiments, the first transparent adhesive layer 130 and the second transparent adhesive layer 140 may be optically clear adhesives (OCA) with high light transmittance. Furthermore, the first transparent adhesive layer 130 and the second transparent adhesive layer 140 may be, for example, liquid optically clear adhesives (LOCA, commonly known as water glue). In some embodiments, the first transparent adhesive layer 130 and the second transparent adhesive layer 140 can be, for example, polyvinyl alcohol, polyethylene terephthalate, phenolic resin, polyvinyl chloride, poly (methyl methacrylate), polystyrene, piperylene, polyethylene, polypropylene, polytetrafluoroethylene, derivatives of any of the above compounds, or combinations of any of the above compounds/derivatives. As mentioned above, through the configuration of the first transparent adhesive layer 130 and the second transparent adhesive layer 140, the effect of preventing moisture intrusion is achieved, and the touch module 100 is ensured to be provided with high touch sensitivity. Specifically, by adjusting or selecting the dielectric constants and thicknesses of the first transparent adhesive layer 130 and the second transparent adhesive layer 140 and the ratio of the thicknesses between the first transparent adhesive layer 130 and the second transparent adhesive layer 140, the effect of preventing moisture intrusion is achieved, and the touch module 100 is ensured to be provided with high touch sensitivity.

Firstly, the dielectric constants of the first transparent adhesive layer 130 and the second transparent adhesive layer 140 will be discussed. Since the distance between the first transparent adhesive layer 130 and the touch sensing electrode 120 (i.e., the touch sensing layer 120) is smaller than the distance between the second transparent adhesive layer 140 and the touch sensing electrode 120 and since the first transparent adhesive layer 130 directly contacts the touch sensing electrode 120, the material selection of the first transparent adhesive layer 130 is closely related to whether the first transparent adhesive layer 130 can effectively protect the metal nanowires in the touch sensing electrode 120. In some embodiments, a material with a lower dielectric constant can be selected as the material of the first transparent adhesive layer 130, because the material with a lower dielectric constant generally has a smaller polarity and therefore has poor moisture absorptivity. Therefore, when the first transparent adhesive layer 130 directly contacts the touch sensing electrode 120, the metal nanowires in the touch sensing electrode 120 can be prevented from electro-migration caused by the influence of moisture. In contrast, a material with a higher dielectric constant generally has better water absorptivity and is therefore easy to increase the ion conductivity, such that the ion exchange or migration rate near the material increases, which in turn leads to the occurrence of electro-migration. Based on the above, the dielectric constant of the first transparent adhesive layer 130 of the present disclosure is between 1.5 and 3.0, so as to provide lower polarity and poor moisture absorptivity. In detail, if the dielectric constant of the first transparent adhesive layer 130 is greater than 3.0, the moisture absorptivity of the first transparent adhesive layer 130 may be too high, causing the moisture in the environment to easily enter the first transparent adhesive layer 130 and further reach the touch sensing electrode 120, which leads to the electro-migration of the metal nanowires in the touch sensing electrode 120.

In some embodiments, a material with a higher dielectric constant can be selected as the material of the second transparent adhesive layer 140, because the material with a higher dielectric constant generally has a higher capacitance and thus can improve the overall touch sensitivity of the touch module 100. It is worth noting that since the first transparent adhesive layer 130 with low moisture absorptivity is disposed between the second transparent adhesive layer 140 and the touch sensing electrode 120, even if the second transparent adhesive layer 140 has a higher dielectric constant, the electro-migration of the metal nanowires in the touch sensing electrode 120 is unlikely to occur. In some embodiments, the dielectric constant of the second transparent adhesive layer 140 is between 3.0 and 8.0 to ensure that the second transparent adhesive layer 140 has a high capacitance. In detail, if the dielectric constant of the second transparent adhesive layer 140 is less than 3.0, the second transparent adhesive layer 140 may not be able to provide a high capacitance, resulting in insufficient touch sensitivity of the touch module 100, which cannot meet the needs of users.

It is worth noting that the dielectric constant of each material can be adjusted or selected through a variety of methods. For example, the dielectric constant of each material can be adjusted by the chemical bond polarity, molecular symmetry, tacticity, position of the polar functional group, and degree of crosslinking and crystallinity of the molecule (e.g., polymer) in the material. Regarding the chemical bond polarity, when the chemical bond distance of the molecule in the material is smaller, the polarity of the molecule is smaller and the dielectric constant of the material is smaller (e.g., the polarity of polyvinyl alcohol, polyethylene terephthalate, or phenolic resin>the polarity of polyvinyl chloride or poly (methyl methacrylate)>the polarity of polystyrene or piperylene>the polarity of polyethylene, polypropylene, or polytetrafluoroethylene). Regarding the molecular symmetry, when the symmetry of the molecule in the material is higher, the polarity of the molecule is smaller and the dielectric constant of the material is smaller (e.g., polytetrafluoroethylene has weak polarity). Regarding the tacticity, the dielectric constant of syndiotactic polymers is larger than the dielectric constant of atactic polymers, and the dielectric constant of atactic polymers is larger than the dielectric constant of isotactic polymers. Regarding the position of the polar functional group, when the polar functional group in the molecule of the material is the side chain of a rigid main chain, the influence of the polar functional group on the polarity of the molecule is relatively small and the contribution to the increase in dielectric constant of the material is relatively small. On the contrary, when the polar functional group in the molecule of the material is the side chain of a flexible main chain, the polarity of the molecule is larger and the dielectric constant of the material is larger. Regarding the degree of the crosslinking of the molecule, when the degree of crosslinking and crystallinity between molecules in the material is higher, the movement of the molecules is restricted and the dielectric constant of the material is smaller. On the other hand, bulky functional groups can also be introduced into each material (e.g., through doping or through the formation of functional groups) to prevent the close packing of molecules in the material and further reduce the dielectric constant of the material. In some embodiments, the functional groups with large steric hindrance may be, for example, benzene as side chain, biphenyl as side chain, adamantane, or combinations thereof.

Thicknesses of each of the first transparent adhesive layer 130 and the second transparent adhesive layer 140 will be discussed. In some embodiments, a thickness H1 of the first transparent adhesive layer 130 is between 10 μm and 1000 μm, so as to slow down the intrusion of moisture into the touch sensing layer 120, thereby providing the metal nanowires with good protection. In detail, if the thickness H1 of the first transparent adhesive layer 130 is smaller than 10 μm, the first transparent adhesive layer 130 may not be able to effectively block moisture, such that the touch sensing layer 120 cannot be effectively protected. In other words, the combination of the dielectric constant and the thickness H1 of the first transparent adhesive layer 130 can ensure that the first transparent adhesive layer 130 essentially blocks moisture (i.e., due to a low moisture absorptivity of the first transparent adhesive layer 130) and slow down the intrusion of moisture into the touch sensing layer 120 by the thickness H1 of the first transparent adhesive layer 130, so as to provide good protection. In some embodiments, when the first transparent adhesive layer 130 and the second transparent adhesive layer 140 are both optically transparent adhesives (OCA), the thickness H1 of the first transparent adhesive layer 130 may be between 10 μm and 200 μm. When the transparent adhesive layer 130 and the second transparent adhesive layer 140 are both liquid optical transparent adhesives (LOCA), the thickness H1 of the first transparent adhesive layer 130 may be between 50 μm and 1000 μm. In some embodiments, a thickness H2 of the second transparent adhesive layer 140 is between 25 μm and 300 μm, or between 50 μm and 1000 μm, so as to improve the overall touch sensitivity of the touch module 100 and ensure that the moisture blocking effect provided by the first transparent adhesive layer 130 is not affected. On the other hand, the combination of the thickness H1 of the first transparent adhesive layer 130 and the thickness H2 of the second transparent adhesive layer 140 can ensure that the touch module 100 has both good water resistance and touch sensitivity. In some embodiments, the ratio of the thickness H1 of the first transparent adhesive layer 130 to the thickness H2 of the second transparent adhesive layer 140 may be between 0.05 and 20. In detail, if the above ratio is less than 0.05, the second transparent adhesive layer 140 may absorb too much moisture due to the excessive thickness of the second transparent adhesive layer 140 (due to the second transparent adhesive layer 140 being a layer with a high dielectric constant) or the thickness of the first transparent adhesive layer 130 is too small to effectively block moisture, which may cause electro-migration of the metal nanowires in the touch sensing layer 120. If the above ratio is greater than 20, the thickness of the second transparent adhesive layer 140 may be too small to provide sufficient capacitance, such that the overall touch sensitivity of the touch module 100 is insufficient.

Reference is made to Table 1, which shows the influence of the dielectric constants of the first transparent adhesive layer 130 and the second transparent adhesive layer 140 and the thickness ratio between the first transparent adhesive layer 130 and the second transparent adhesive layer 140 on the overall capacitance of the touch module 100 by each comparative example and embodiment. It should be noted that in Table 1, the total thickness of the first transparent adhesive layer 130 and the second transparent adhesive layer 140 is set to be about 150 μm, and the capacitance shown in each embodiment is a simulated capacitance obtained by simulating the stacking structure in FIG. 1 through software.

TABLE 1

|  | dielectric constant of first transparent adhesive layer | dielectric constant of second transparent adhesive layer | thickness ratio of first transparent adhesive layer to second transparent adhesive layer | simulated capacitance |
|---|---|---|---|---|
| comparative example 1 | 1.5 | w/o | — | 9.0916 |
| comparative example 2 | 1.6 | w/o | — | 9.6624 |
| comparative example 3 | 2.5 | w/o | — | 15.082 |
| comparative example 4 | w/o | 3.0 | — | 18.073 |
| comparative example 5 | w/o | 3.2 | — | 19.294 |
| comparative example 6 | w/o | 5.0 | — | 30.124 |
| comparative example 7 | w/o | 7.0 | — | 42.157 |
| comparative example 8 | w/o | 8.0 | — | 48.174 |
| embodiment 1 | 1.5 | 3.0 | 0.05-20 | 9.566-17.112 |
| embodiment 2 | 1.5 | 5.0 | 0.05-20 | 11.339-26.163 |
| embodiment 3 | 1.6 | 8.0 | 0.05-20 | 11.106-40.135 |
| embodiment 4 | 2.5 | 3.0 | 0.05-20 | 15.12-17.902 |
| embodiment 5 | 2.5 | 5.0 | 0.05-20 | 15.965-28.533 |
| embodiment 6 | 2.5 | 8.0 | 0.05-20 | 16.875-42.373 |
| embodiment 7 | 3.0 | 3.0 | 0.05-20 | 18.055-18.079 |
| embodiment 8 | 3.0 | 5.0 | 0.05-20 | 18.525-29.115 |
| embodiment 9 | 3.0 | 8.0 | 0.05-20 | 19.15-45.234 |

According to the comparative examples in Table 1, when the first transparent adhesive layer 130 is used alone as the adhesive layer of the touch module, the touch module has a lower simulated capacitance, and when the second transparent adhesive layer is used alone as the adhesive layer of the touch module, the touch module has a higher simulated capacitance. It can be seen from the embodiments in Table 1 that when the first transparent adhesive layer 130 and the second transparent adhesive layer 140 are used as the adhesive layers of the touch module 100 at the same time, the simulated capacitance of the touch module 100 can be maintained in the standard range in order to meet the specification requirements, in which the performance in simulated capacitance of embodiment 6 can even be close to the performance in simulated capacitance of comparative example 7 that uses the second transparent adhesive layer 140 with a high dielectric constant alone in the touch module.

In some embodiments, the touch module 100 further includes a cover 160 disposed on the second transparent adhesive layer 140. The cover 160 and the substrate 110 may, for example, sandwich the other layers of touch module 100 therebetween. In some embodiments, the cover 160 may include flexible materials having flexibility, which refers to materials having certain strength and certain flexibility in the industry, such as but not limited to polyimide, polycarbonate, polyvinyl chloride, polystyrene, polyether sulfide, polyester, polyamide amine, polybutene, polyethylene, polymethyl methacrylate, polybutylene terephthalate, polyethylene terephthalate, polyether ether ketone, polyurethane, polyether imide, polytetrafluoroethylene, acrylic, or combinations thereof. In some other embodiments, the material of the cover 160 may include an alkaline glass, such as a sodium glass, a potassium glass, a calcium glass, or combinations thereof. The use of the alkaline glass as the material of the cover 160 can further prevent the electro-migration of the metal nanowires in the touch sensing layer 120, which will further be verified and discussed below.

Reference is made to Table 2, which shows the influence of the dielectric constants and thicknesses of the first transparent adhesive layer 130 and the second transparent adhesive layer 140 on the resistance variation and optical properties of the touch module 100 by each comparative example and embodiment. More specifically, the resistance variation and optical properties of the touch module 100 (such as haze, light transmittance, and b* value in L*a*b* color space) are tested under HS6590 test conditions (i.e., high temperature and high humidity test conditions: temperature of 65° C., relative humidity of 90%, and a voltage of 5 volts) for 504 hours.

TABLE 2

| | dielectric constant/thickness (first transparent adhesive layer) | dielectric constant/thickness (second transparent adhesive layer) | cover | resistance variation | haze, light transmittance, and b* value |
|---|---|---|---|---|---|
| | The first transparent adhesive layer and the second transparent adhesive layer are OCA or LOCA | | | | |
| comparative example 9 | w/o | 4.3/150 μm | non-alkaline glass | do not meet the standard | w/o measuring |
| embodiment 10 | 2.56/10 μm | 4.3/150 μm | | −9.6% | pass |
| embodiment 11 | 2.56/25 μm | 4.3/125 μm | | −8.7% | pass |
| embodiment 12 | 2.56/50 μm | 4.3/100 μm | | −9.0% | pass |
| embodiment 13 | 2.92/25 μm | 4.3/125 μm | | −0.7% | pass |
| embodiment 14 | 2.92/50 μm | 4.3/100 μm | | −1.2% | pass |
| embodiment 15 | 2.92/200 μm | 4.3/25 μm | | −2.8% | pass |
| embodiment 16 | 2.92/25 μm | 4.3/300 μm | | −1.5% | pass |
| comparative example 10 | w/o | 4.3/150 μm | alkaline glass | do not meet the standard | w/o measuring |
| embodiment 17 | 2.56/10 μm | 4.3/150 μm | | −8.2% | pass |
| embodiment 18 | 2.56/25 μm | 4.3/125 μm | | −7.8% | pass |
| embodiment 19 | 2.56/50 μm | 4.3/100 μm | | −5.6% | pass |
| embodiment 20 | 2.56/100 μm | 4.3/125 μm | | −6.6% | pass |
| embodiment 21 | 2.56/200 μm | 4.3/25 μm | | −7.1% | pass |
| embodiment 22 | 2.56/25 μm | 4.3/300 μm | | −1.1% | pass |
| comparative example 11 | w/o | 4.6/150 μm | | do not meet the standard | w/o measuring |
| embodiment 23 | 2.56/10 μm | 4.6/150 μm | | −1.0% | pass |
| embodiment 24 | 2.56/25 μm | 4.6/125 μm | | −0.7% | pass |
| embodiment 25 | 2.56/50 μm | 4.6/100 μm | | −1.2% | pass |
| comparative example 12 | w/o | 5.0/150 μm | | do not meet the standard | w/o measuring |
| embodiment 26 | 2.56/10 μm | 5.0/150 μm | | −6.0% | pass |
| embodiment 27 | 2.56/25 μm | 5.0/125 μm | | −4.5% | pass |
| embodiment 28 | 2.56/50 μm | 5.0/100 μm | | −5.3% | pass |
| embodiment 29 | 2.5/1000 μm | 5.0/50 μm | | −6.1% | pass |
| embodiment 30 | 2.5/800 μm | 5.0/200 μm | | −5.8% | pass |
| embodiment 31 | 2.5/500 μm | 5.0/500 μm | | −5.3% | pass |
| embodiment 32 | 2.5/200 μm | 5.0/800 μm | | −3.5% | pass |
| embodiment 33 | 2.5/50 μm | 5.0/1000 μm | | −1.7% | pass |

It can been seen from the comparative examples in Table 2 that since the second transparent adhesive layer 140 has a high dielectric constant, second transparent adhesive layer 140 has a high moisture absorptivity, such that when the second transparent adhesive layer 140 is used alone as the adhesive layer of the touch module, second transparent adhesive layer 140 cannot effectively prevent moisture in the environment from entering the touch sensing layer 120, resulting in the touch module not passing the resistance variation test. That is, the resistance variation of the touch module is too large and does not fall within the standard range (the standard range: −15%≤resistance variation≤10%). It can be seen from the embodiments in Table 2 that when the first transparent adhesive layer 130 and the second transparent adhesive layer 140 are used as the adhesive layer of the touch module 100 at the same time, the resistance variation of the touch module 100 falls within the standard range. In other words, after the touch module 100 of the present disclosure undergoes 504 hours of testing under the HS6590 test condition, the resistance variation is greater than or equal to −15% and less than or equal to 10%, and hence can pass the resistance variation test. In addition, the touch module 100 of each embodiment has a haze variation of less than or equal to 0.3% and a light transmittance variation of greater than or equal to −0.3% (e.g., −0.2%) after 504 hours of testing under the HS6590 test condition. In other words, the clarity and transparency of the touch module 100 of the present disclosure can still be well maintained in a high temperature and high humidity environment. In addition, after the touch module 100 of each embodiment undergoes 504 hours of testing under the HS6590 test condition, the variation in b* value of the touch module in the L*a*b* color space is less than or equal to 0.3. In other words, the displayed color of the touch module 100 of the present disclosure can still be well maintained in a high temperature and high humidity environment, such that the color is not excessively yellow. Based on the above, the touch module 100 of the present disclosure can pass the optical property test.

Figure 2:
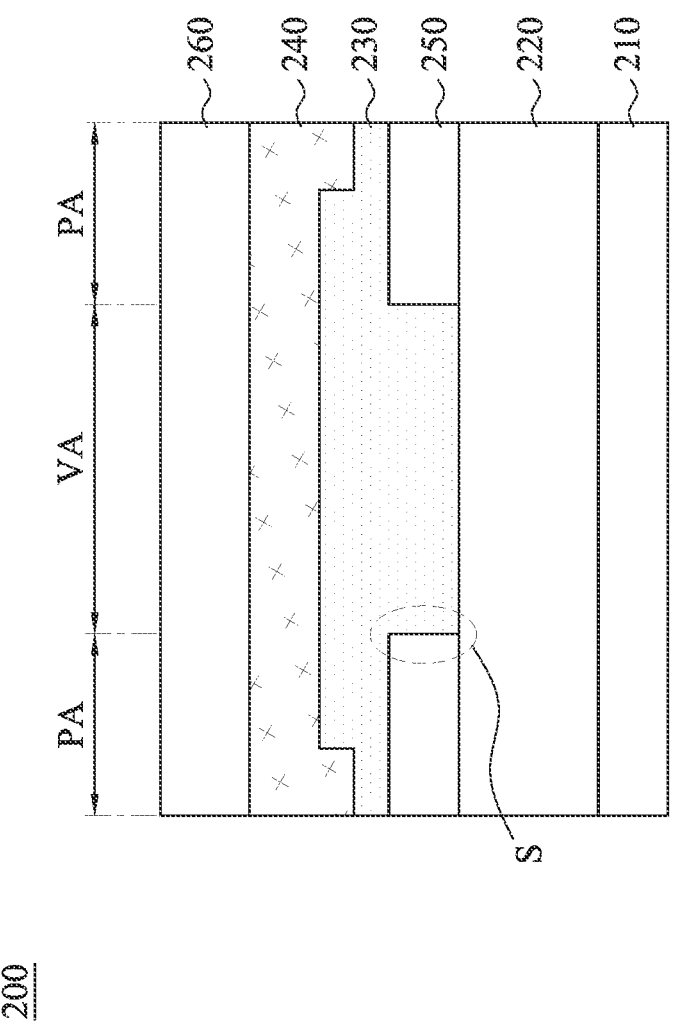
FIG. 2 is a schematic side view of a touch module according to some other embodiments of the present disclosure.

Reference is made to FIG. 2, which is a schematic side view of a touch module 200 according to some other embodiments of the present disclosure. It should be noted that the touch module 200 of FIG. 2 and the touch module 100 of FIG. 1 have substantially the same component configuration and connection relationship, materials, and functions, which will not be repeated hereinafter, and only the differences will be discussed in detail below. At least one difference between the touch module 200 of FIG. 2 and the touch module 100 of FIG. 1 is that the peripheral circuit layer 250 of the touch module 200 is disposed between the touch sensing layer 220 and the first transparent adhesive layer 230. Since the peripheral circuit layer 250 is stacked on the touch sensing layer 220, the peripheral circuit layer 250 and the touch sensing layer 220 constitute a step area S. In some embodiments, the first transparent adhesive layer 230 extends from the visible area VA to the peripheral area PA of the substrate 210 to cover the touch sensing layer 220, the peripheral circuit layer 250, and the step area S. When the first transparent adhesive layer 230 covers the step area S, no bubbles, waviness, or wrinkles are formed near the step area S. In other words, the first transparent adhesive layer 230 can be tightly adhered to the peripheral circuit layer 250 and the touch sensing layer 220. That is, there is no bubble or space between the first transparent adhesive layer 230 and the peripheral circuit layer 250 as well as between the first transparent adhesive layer 230 and the touch sensing layer 220, thereby providing good bonding performance and improving product yield to meet product specifications. On the other hand, through the configuration of the second transparent adhesive layer 240, the step formed by the first transparent adhesive layer 230 in the step area S can be filled with the second transparent adhesive layer 240. That is, the second transparent adhesive layer 240 can have an anti-step function to facilitate the convenience of the overall stacking of the structure.

Figure 3:
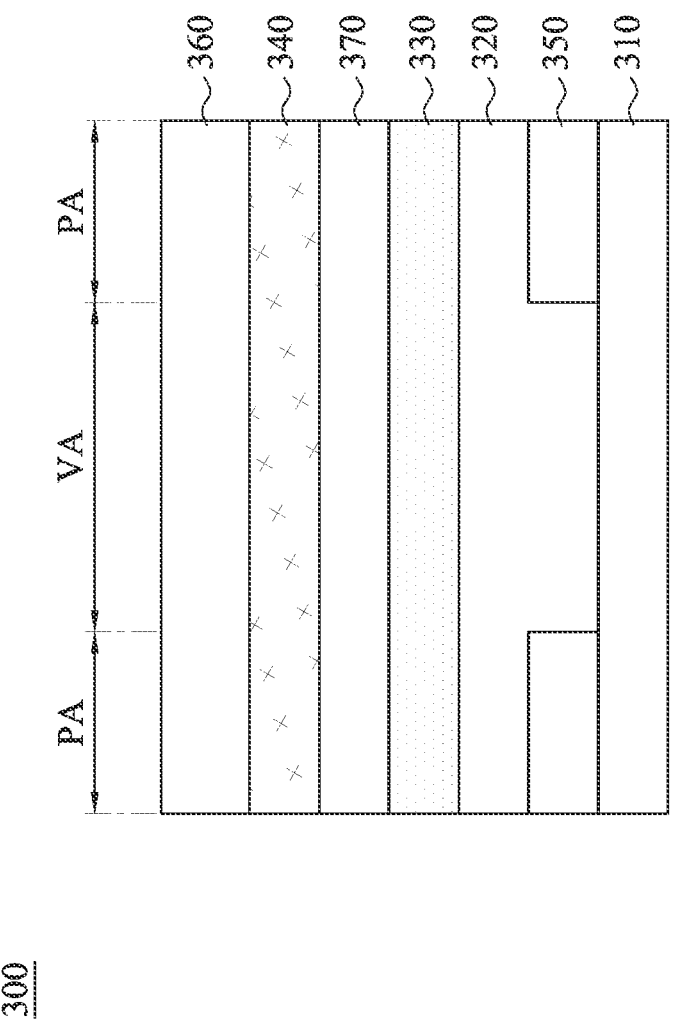
FIG. 3 is a schematic side view of a touch module according to some other embodiments of the present disclosure.

Reference is made to FIG. 3, which is a schematic side view of a touch module 300 according to some other embodiments of the present disclosure. It should be noted that the touch module 300 of FIG. 3 and the touch module 100 of FIG. 1 have substantially the same component configuration and connection relationship, materials, and functions, which will not be repeated hereinafter, and only the differences will be discussed in detail below. At least one difference between the touch module 300 of FIG. 3 and the touch module 100 of FIG. 1 is that the touch module 300 of FIG. 3 further includes a transparent plastic layer 370 disposed between the first transparent adhesive layer 330 and the second transparent adhesive layer 340 to cover the entire surface of the first transparent adhesive layer 330. In some embodiments, the material of the transparent plastic layer 370 may include polyethylene terephthalate, poly (methyl methacrylate), cycloolefin polymer, polycarbonate, colorless polyimide, soft glass, or combinations thereof.

Figure 4:
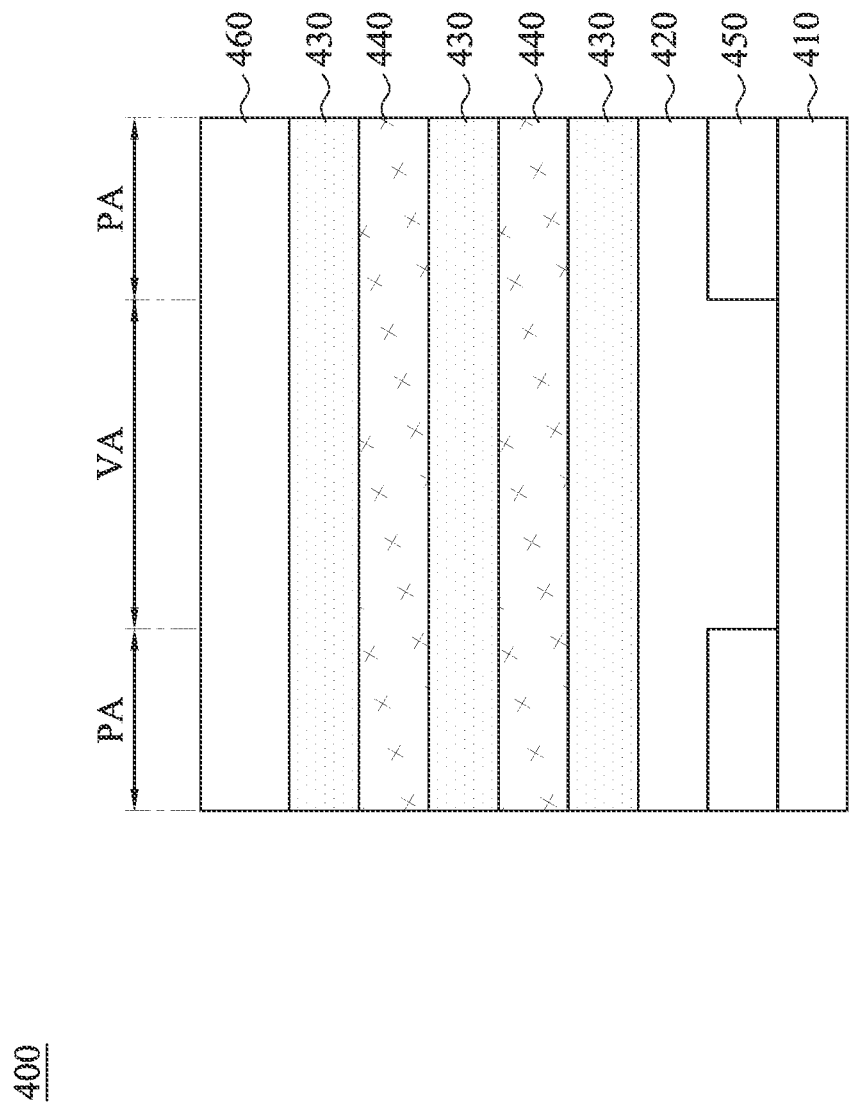
FIG. 4 is a schematic side view of a touch module according to some other embodiments of the present disclosure.

Reference is made to FIG. 4, which is a schematic side view of a touch module 400 according to some other embodiments of the present disclosure. It should be noted that the touch module 400 of FIG. 4 and the touch module 100 of FIG. 1 have substantially the same component configuration and connection relationship, materials, and functions, which will not be repeated hereinafter, and only the differences will be discussed in detail below. At least one difference between the touch module 400 of FIG. 4 and the touch module 100 of FIG. 1 is that the touch module 400 of FIG. 4 has multiple first transparent adhesive layers 430 and multiple second transparent adhesive layers 440. For example, the touch module 400 may have three first transparent adhesive layers 430 and two second transparent adhesive layers 440, and the three first transparent adhesive layers 430 and the two second transparent adhesive layers 440 may be alternately stacked (as shown in FIG. 4). However, the numbers and configuration of the first transparent adhesive layer 430 and the second transparent adhesive layer 440 are not intended to limit the present disclosure and can be configured according to actual needs. In some embodiments, when the touch module 400 has multiple second transparent adhesive layers 440, every second transparent adhesive layer 440 may have different functions. For example, some of the second transparent adhesive layers 440 may have the aforementioned anti-step function, some of the second transparent adhesive layers 440 may have high viscosity and high modulus under high temperature and high pressure to inhibit the generation of bubbles, and some of the second transparent adhesive layers 440 may have high elasticity and low glass transition temperature to undergo small changes in modulus and viscosity and have fast deformation recovery speed at high temperatures, thereby having good flexibility. In other words, the configuration of the second transparent adhesive layers 440 can not only improve the overall touch sensitivity of the touch module 400, but also provide the functions of anti-step, suppressing bubbles, and improving flexibility.

According to the aforementioned embodiments of the present disclosure, the touch module of the present disclosure has at least two optically transparent adhesive layers, and by adjusting the respective characteristics of the two optically transparent adhesive layers (e.g., dielectric constant, thickness, etc.), the probability of moisture intrusion from the environment can be reduced, and the touch module can be provided with high capacitance. As such, electro-migration of metal nanowires can be avoided or the speed of electro-migration of metal nanowires can be slowed down, thereby meeting the specification requirements for improving product reliability testing and ensuring that the touch module has high touch sensitivity.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A touch module, comprising:
a substrate having a visible area and a peripheral area surrounding the visible area;
a touch sensing layer disposed on the substrate and located in the visible area;
at least one first transparent adhesive layer disposed on the touch sensing layer, wherein a dielectric constant of the first transparent adhesive layer is between 1.5 and 3.0; and
at least one second transparent adhesive layer disposed on the first transparent adhesive layer, wherein a dielectric constant of the second transparent adhesive layer is between 3.0 and 8.0.

2. The touch module of claim 1, wherein the touch sensing layer comprises a matrix and a plurality of metal nanostructures distributed in the matrix, and the first transparent adhesive layer is in contact with the touch sensing layer.

3. The touch module of claim 1, wherein a thickness of the first transparent adhesive layer is between 10 μm and 1000 μm.

4. The touch module of claim 1, wherein a ratio of a thickness of the first transparent adhesive layer to a thickness of the second transparent adhesive layer is between 0.05 and 20.

5. The touch module of claim 1, wherein after 504 hours of testing during which a temperature is 65° C., a relative humidity is of 90%, and a voltage applied to the touch module is 5 volts, a haze variation of the touch module is less than or equal to 0.3%, and a light transmittance variation of the touch module is greater than or equal to −0.3%.

6. The touch module of claim 1, wherein after 504 hours of testing during which a temperature is 65° C., a relative humidity is of 90%, and a voltage applied to the touch module is 5 volts, a variation in b* value of the touch module in L*a*b* color space is less than or equal to 0.3.

7. The touch module of claim 1, wherein after 504 hours of testing during which a temperature is 65° C., a relative humidity is of 90%, and a voltage applied to the touch module is 5 volts, a resistance variation of the touch module is greater than or equal to −15% and less than or equal to 10%.

8. The touch module of claim 1, further comprising:
a cover disposed on the second transparent adhesive layer, wherein a material of the cover comprises an alkaline glass.

9. The touch module of claim 8, wherein the alkaline glass comprises a sodium glass, a potassium glass, a calcium glass, or combinations thereof.

10. The touch module of claim 1, further comprising:
a peripheral circuit layer disposed between the touch sensing layer and the first transparent adhesive layer and located in the peripheral area, wherein the peripheral circuit layer and the touch sensing layer constitute a step area, and the first transparent adhesive layer covers the step area.

* * * * *